Figure 1:
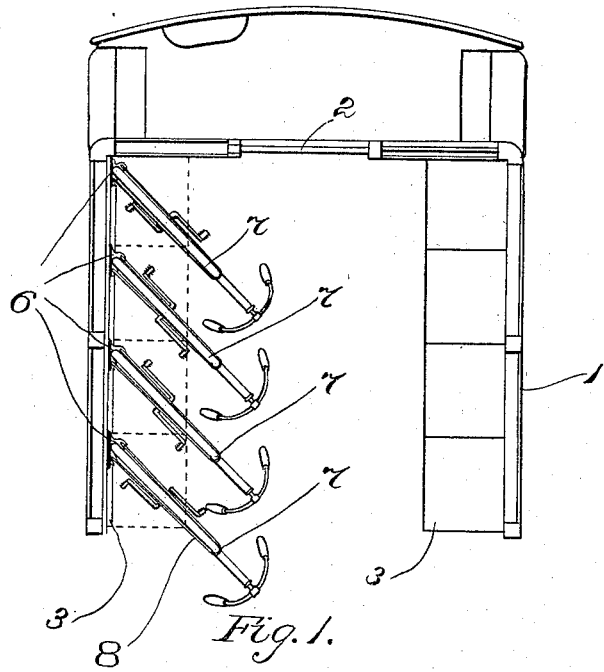

No. 641,058. Patented Jan. 9, 1900.
F. W. WHITCHER.
CAR.
(Application filed June 15, 1898.)

(No Model.) 3 Sheets—Sheet 1.

Witnesses: Inventor:
Oscar F. Hill Frank W. Whitcher
by McLeod Calver & Randall
Attorneys.

THE NORRIS PETERS CO., PHOTO-LITHO., WASHINGTON, D. C.

No. 641,058. Patented Jan. 9, 1900.
F. W. WHITCHER.
CAR.
(Application filed June 15, 1898.)
(No Model.) 3 Sheets—Sheet 2.
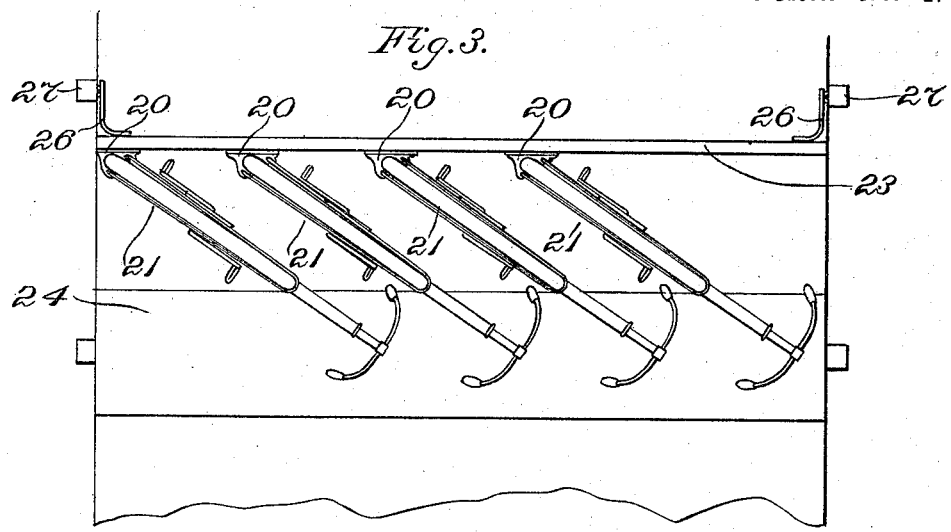
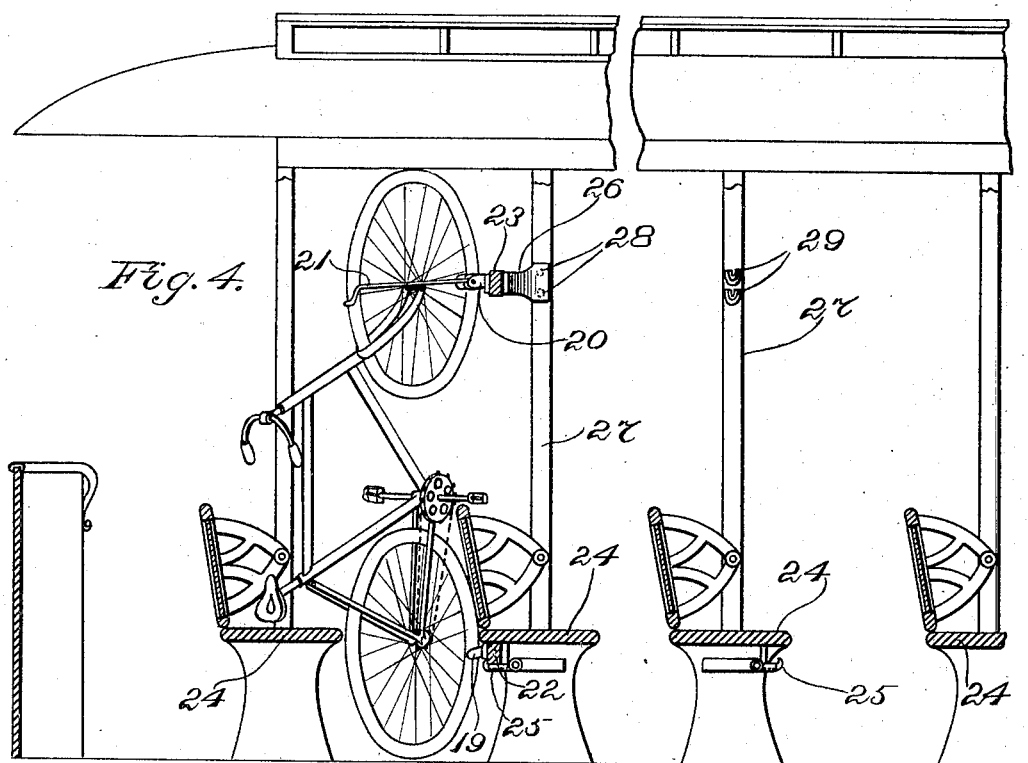
Witnesses:
Oscar F. Hill
Lorine Hall Rice
Inventor:
Frank W. Whitcher
by Macleod Calver & Randall
Attorneys.

UNITED STATES PATENT OFFICE.

FRANK W. WHITCHER, OF BOSTON, MASSACHUSETTS.

CAR.

SPECIFICATION forming part of Letters Patent No. 641,058, dated January 9, 1900.

Application filed June 15, 1898. Serial No. 683,516. (No model.)

*To all whom it may concern:*

Be it known that I, FRANK W. WHITCHER, a citizen of the United States, residing at Boston, in the county of Suffolk and State of Massachusetts, have invented certain new and useful Improvements in Cars, of which the following is a specification, reference being had therein to the accompanying drawings.

At the present day the necessity for a street-car that shall accommodate bicycles is becoming very evident. The use of bicycles by city residents is common; but the city resident is unable to ride for pleasure on crowded or paved streets and cannot reach suburban or country roads without using up a large part of his time and strength. He therefore would be greatly aided if he could resort to the street-cars for transportation as far as the more desirable places for riding purposes. Also it frequently happens that by reason of some injury to the bicycle, such as a tire puncture, or by reason of a stretch of bad road or a strong head-wind or by reason of the coming on of rain a rider or party of riders is in need of some facilities for transportation as might conceivably be constituted by the street-cars. The extensive network of electric and cable lines that exists at the present time within cities and towns, with branches extending often for miles into the surrounding country region, more especially in the case of the electric lines, invites such a use of the cars. The ordinary type of car, however, offers no suitable accommodation for bicycles. Ordinarily there is no attempt whatever made to provide for the carrying of the latter. The necessity of providing the entire interior space of the car with seats for passengers in order that the carrying capacity of a single car may be as great as possible when only passengers are being carried has been thought to preclude any provision for receiving bicycles within the car. Various other restrictive conditions impose themselves. It is essential, for instance, that while being carried the bicycles should occupy a minimum of space, so as to displace as few passengers as possible; also, that the bicycles should be so disposed within the car as to offer the least obstruction to passengers entering and leaving the car. It is also essential that the portions of the bicycle that can come into contact with the clothing of the passengers should be such as not to soil or tear them. The difficulty of conforming to these and other practical requirements has led inventors in the few attempts that have been made to provide for transportation by street-cars to adopt the plan of placing bicycle-holding devices upon the outside of the car—as, for instance, on the dashboard. Such arrangements offer no protection to the bicycle in inclement weather or on dusty roads, expose it to injury from vehicles and other cars, and remove it from the custody of the rider to a position from which it may be stolen without detection.

The general aim of the present invention is to obviate the foregoing disadvantages while conforming to the practical requirements above stated.

The invention consists in a car which may be of the ordinary type and provided with the full number of seats for passengers, the same being convertible in whole or in part to receive and transport bicycles in its interior space and with regard not only to the safety and protection of the bicycles, but also to the convenience and accommodation of the passengers.

My invention embraces equally open and closed cars with modifications of form corresponding with the differences in such cars, and I shall now proceed to describe embodiments of the invention in cars of both types with the aid of the accompanying drawings, and afterward I shall particularly point out and distinctly define the essential characteristics of the invention in the claims at the close of this specification.

Figure 2:
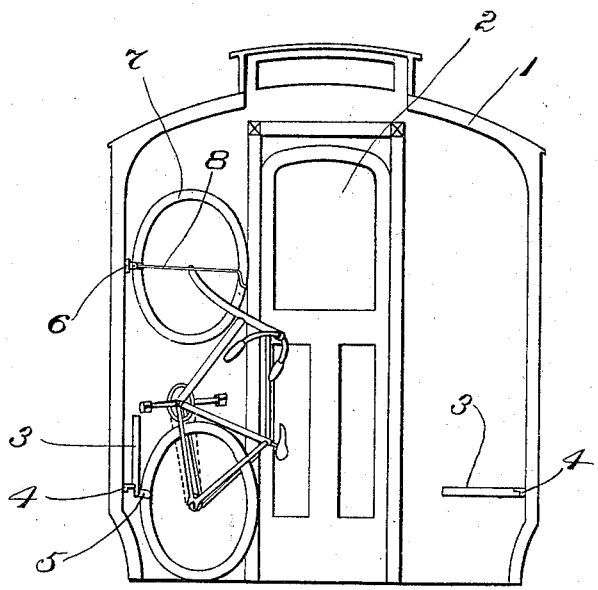
Figure 5:
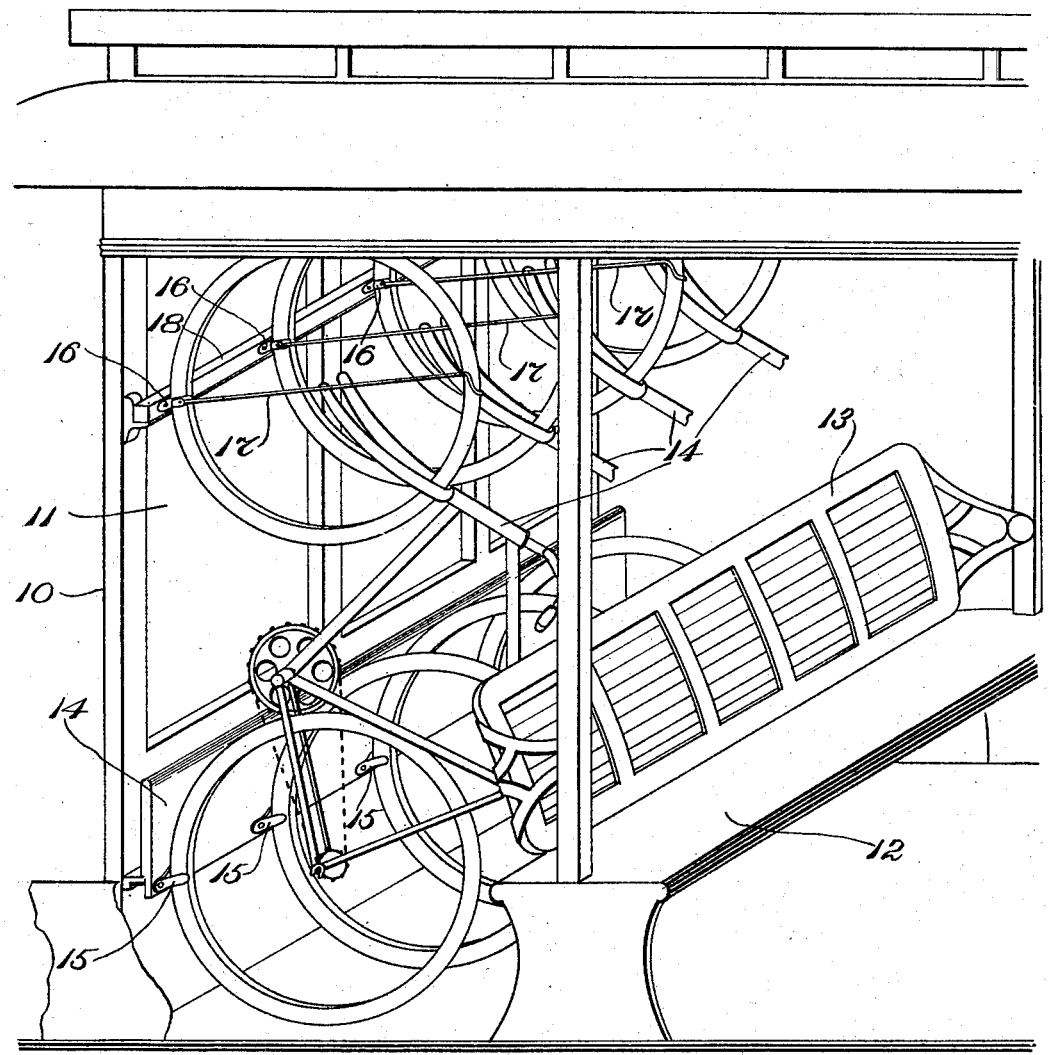

In the drawings, Figure 1 is a plan view of the interior of one end of a closed car constructed in accordance with my invention. Fig. 2 is an end elevation of the same. Fig. 3 is a plan view of the interior of one end of an open car similarly provided. Fig. 4 is a side elevation of the same, partly in vertical section. Fig. 5 is an isometric view of another form of open car similarly provided. Fig. 6 is a detail of the sockets and bracket of Figs. 3 and 4.

Referring first to Figs. 1 and 2, the numeral 1 designates a car-body formed on the usual lines in both horizontal and vertical section. The car is shown as provided with a door 2 in the middle of the end; but my invention is applicable without change to cars that have the door at either side of the middle of the end or at the middle of the side of the car. 3 3 are the seats for passengers, the type of car selected for illustration being that in which a single line of seats runs along each side of the car, the passengers facing the middle of the car. Those seats that occupy the portion of the car that is to be convertible to receive bicycles are made movable and adapted to be shifted from the position in which they serve as seats (indicated by dotted lines in Fig. 1) in order to make room for the reception of bicycles. The most satisfactory arrangement that I have found for accomplishing this shift of position is to hinge the rear edge of such seats, as at 4, Fig. 2, to the car-body in such manner as to permit one or more of the seats to be turned upward and backward against the car-body, as is shown in the case of the seats at the left in Fig. 2. In this upturned position of the seat its cushion or seating surface, as also the cushion or surface at the back of the seat, is entirely protected from becoming marred or soiled by contact with the tires or other parts of the bicycle. 5 6 are bicycle-holding devices secured to the car-body in the proper relation with respect to the movable seat to support a bicycle, as 7, in the space made vacant by the shifting of the seat. With the type of car here shown the holders will be affixed beneath and above the seat, respectively, the holder 5 being beneath the seat, while the holder 6 is at such elevation above it as to receive the rim of the forward wheel of the bicycle when the latter is placed against the side of the car in an upended position, as shown. It may be found necessary in narrow cars to arrange the holders so that they shall support the bicycles at an angle to the side of the car, and such a position is indicated in the drawings. The particular holders 5 and 6 that I have shown are U-shaped, each holder receiving and compressing slightly the tire of the wheel that is applied thereto, the upper holder 6 being herein provided with a swinging bail or retainer 8 to encircle the elevated wheel. In some cases this bail or retainer need not be used, and various other forms of holders may be substituted for that shown.

Fig. 5 shows one mode of embodying my invention in an open car. The car which is illustrated in part in the said figure is of the type in which at each end of the series of seats there is a fixed vertical partition 10 extending transversely of the car and containing windows, the spaces for which last are designated 11. 12 designates one of the seats with reversible backs 13 intermediate the said partitions, and 14 designates the seat, which is applied to the partitions. In carrying the invention into effect in the case of the present illustration or embodiment of the same I hinge seat 14 so as to enable it to be turned upwardly, and I employ holders 15 15, which are exposed by the upturning of the said seat and which are adapted to engage with the lower wheels of bicycles standing in the upended position, that is indicated in the case of the bicycles which are shown in Fig. 5. The said holders 15 15 may, for instance, be applied to the under side of seat 14, as in Fig. 3. For engagement with the elevated wheels of the bicycles I provide an upper set of holders, as at 16 16, which may have combined therewith, if preferred, the bails or retainers 17 17. Where it is necessary to provide a special support for the upper series of holders, a cross bar or rail 18 may be mounted in suitable manner on the partition 10.

In Fig. 5 a series of four bicycles are shown standing in the space next adjacent to the partition 10 and supported with their wheels next adjacent to the partition with the handlebars and saddles thereof turned toward the reversed back 13 of the first intermediate seat 12. In order that the said handle-bars and saddles may not unduly project to the inconvenience of the occupants of the said seat 12, the holders 15 and 16 are mounted, as hereinabove indicated, to cause the bicycles to assume an inclined position with respect to the partition 10.

Figs. 3 and 4 show an ordinary form of open car, in which there are no end partitions, corresponding with that which is designated 10 in the said Fig. 5. In the case of this form of car I have contemplated utilizing the space between the first and second seats at either or each end of the series of seats 24 24, the bicycles being caused to stand in the space between such two seats in an upended position, preferably with the wheels thereof next the second seat and with the handle-bars and saddles projecting above the first seat. In these figures the parts which are designated 19, 20, and 21 correspond with the lower and upper holders and swinging bails or retainers of the preceding figures. The lower series of holders 19 are herein shown applied to a cross-bar 22, and the upper series of holders are shown applied to a cross-bar 23. I have herein shown the cross-bars 22 and 23 as removably applied to supports adjacent to the second seat, the cross-bar 22 being placed beneath the second seat and held in place by a movable latch 25 and the cross-bar 23 being connected, by means of brackets 26, to the posts 27 at the ends of the said second seat, the brackets 26 being fixed to the cross-bar 23 and having headed pins 28 28, which are detachably received in sockets 29 29 on the said posts 27. The detachable connection of the cross-bars 22 and 23 to the supports therefor enables the holding devices to be shifted from end to end of the car as the direction of the movement of the latter is reversed. In Fig. 4 I have represented the opposite end portions of a car with the intermediate portions of the latter broken out in order to illustrate more clearly the nature of the provisions which may be made for the application and support of the bicycle-holding devices. It will be seen that these bicycle-holding devices or supports are so placed relative to the seats that when a bicycle or series of bicycles are in position on the supports each bicycle will occupy but a single seating-space and will not encroach upon the other seating-spaces, which may be occupied by passengers.

What I claim is—

1. A car having seats for passengers, and bicycle supporting or carrying devices located above said seats and in such relation thereto as that bicycles may be carried in a vertical position in a seating-space unoccupied by passengers without encroaching upon an adjoining space or inconveniencing the occupants of adjacent seating-spaces.

2. A car having within the same seats and bicycle-supports occupying the same sections of its interior space, said bicycle-supports being located above and below said seats and in such relation thereto that bicycles may be conveniently carried and closely packed in vertical positions in sections unoccupied by passengers, and such sections may, therefore, be devoted to the seating of passengers or the reception of bicycles, interchangeably, substantially as described.

3. A car having seats for passengers, and bicycle supporting and carrying devices located above and below said seats and in such relation thereto as that bicycles may be carried in vertical positions in a seating-space unoccupied by passengers without encroaching upon the adjoining space or inconveniencing the occupants of the adjacent seating-space, said seats being movable to provide spaces for the reception of bicycles.

4. In a car having portions of its interior convertible to accommodate either passengers or bicycles, the combination with the car-body of a movable seat adapted to be shifted from its position as a seat in order to make room for the reception of a bicycle, and bicycle-supporting devices secured to the car-body above said seat in proper relation to such seat to support a bicycle in a vertical position in the space made vacant by the shifting of the seat, substantially as described.

5. In a car having portions of its interior convertible to accommodate either passengers or bicycles, the combination with the car-body, of a movable seat adapted to be shifted from its position as a seat in order to make room for the reception of a bicycle, bicycle-supporting devices secured to the car-body above said seat, and bicycle-supporting devices secured to said hinged seat whereby the bicycle may be supported in a vertical position in the space made vacant by the shifting of the seat, substantially as described.

In testimony whereof I affix my signature in presence of two witnesses.

FRANK W. WHITCHER.

Witnesses:
   WM. A. MACLEOD,
   CHAS. F. RANDALL.